Jan. 8, 1929.  
J. T. LOVETT, JR  
POTTED PLANT SEAL  
Filed Jan. 27, 1923  
1,698,021
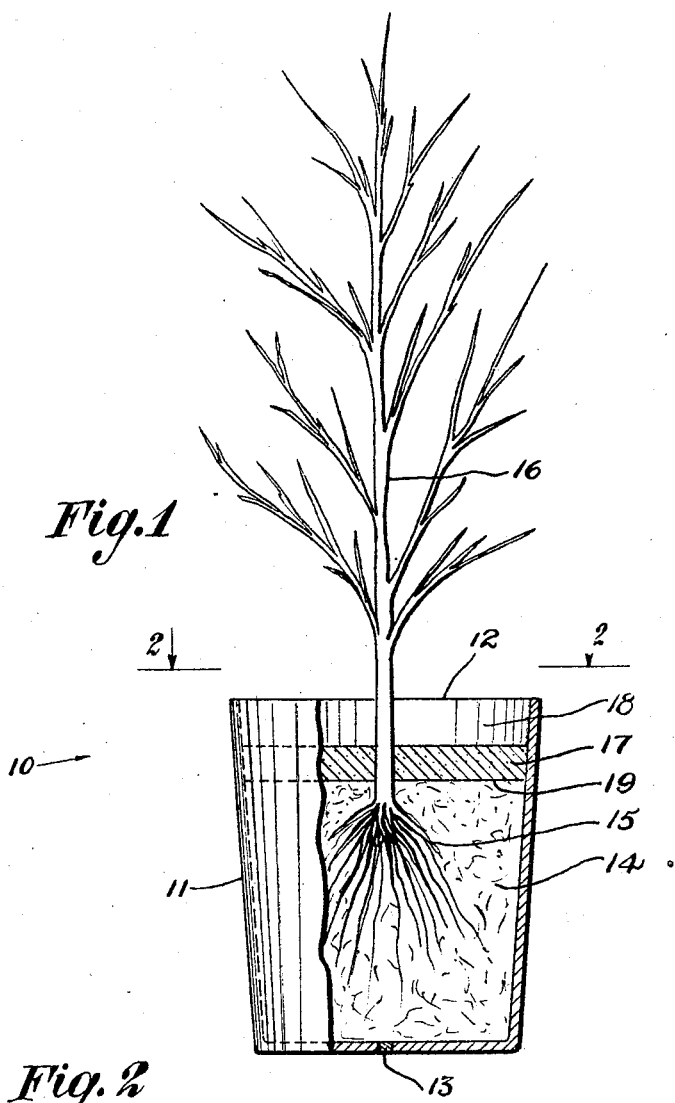
Fig.1
Fig.2
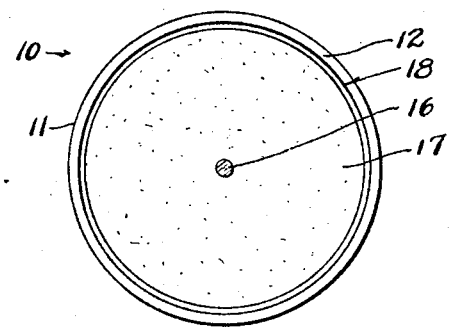

Patented Jan. 8, 1929.

1,698,021

UNITED STATES PATENT OFFICE.

JOHN THOMPSON LOVETT, JR., OF LITTLE SILVER, NEW JERSEY.

POTTED-PLANT SEAL.

Application filed January 27, 1928. Serial No. 249,975.

This invention relates to potted plants.

One object of the invention is to provide an improved means for permitting a potted plant to be safely transported.

Another object of the invention is the provision of improved means associated with a vessel for a potted plant whereby the earth and other contents of the vessel are safely retained therein.

A further object of the invention is the production of a device of the character described in which an improved seal is provided, which is porous to permit water to percolate therethrough.

Still another object of the invention is to provide a device of the character described, including a guard that prevents entrance of grubs and insects into the pot.

In the transportation of potted plants it is desirable and essential to furnish a means to prevent the earth from leaving the vessel, or other receptacle in which the roots of the plant are contained. By this invention, I obtain a reliable and positive seal for the said earth, which can be quickly and cheaply applied, and is porous to permit water to percolate therethrough for watering the plant, so that the seal need not be removed. This seal can be easily broken with a hammer when desired, and when for example, the plant is to be transplanted to the ground. When the plant is "growing on", as for instance, in a store or greenhouse, a thin layer or seal of any suitable material within a wide range may be used over the earth by pouring the same thereon or in any similar manner, to prevent the entrance of grubs or insects into the pot. This thin layer may either be removed at the appropriate time, or a thicker layer of a holding material placed thereover to securely retain the earth in the pot.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a view in elevation of an embodiment of the invention with parts removed to show interior construction.

Fig. 2 is a plan section of the same taken on the line 2—2 of Fig. 1.

Referring now in detail to the drawings, 10 denotes a device embodying the invention. Said device is seen to include a vessel 11 of any suitable type or construction. The said vessel may be made of a well known material, as for example, clay, or paper of a waterproof character. The vessel has the usual open top 12, and a drainage hole 13 in the bottom thereof. Received in said vessel is a mass of earth 14 and roots 15 of the plant 16.

Overlying the earth and roots, and in spaced relation to the top edge of the vessel 11 is a seal 17 of a relatively strong porous material. The said seal may consist of cement or plaster of Paris, and it has good engagement with the side wall of the vessel. The vessel thus constitutes in effect a rigid, unitary container enclosing the earth and roots at the top, as well as at the bottom and sides. The seal permits the plant to be transported without causing any of the earth of the vessel to leave the same due to jarring action, and the like. When it is desired to water the plant, a quantity of water can be spilled into the vessel approximately up to the top edge thereof. On standing, the water will slowly percolate through the plaster of Paris to water the plant. The top portion 18 of the vessel 11, above the seal, may constitute a measure, if desired, of the quantity of water periodically required by the plant. A quantity of plaster of Paris may also be placed in the drain hole 13. Thus the pot is sealed at all places against the entrance of grubs and insects thereinto. When "growing on", a very thin layer of a sealing material may be placed directly over the earth to prevent the entrance of grubs or insects, and this layer can be removed later, or the layer 17 placed thereover.

In practice, the so-called "ball" of the plant 16 is inserted into a vessel 11, after which a certain amount of earth or humus is added, and gently tamped down. When the upper surface 19 of the earth has become sufficiently smooth and firm, a predetermined quantity of plaster of Paris is poured into the vessel. This sets in the course of a few minutes, and expands tightly engaging the side wall of the said vessel. The article is now ready to be shipped. The seal 17 can be readily removed by cracking the same with a hammer.

It is thus seen that I have provided a device which meets the objects of the invention and is well adapted to satisfy the requirements of practical use.

I claim:

1. In combination with a pot and a potted plant therein, means for sealing the earth in said pot comprising a layer of porous plastic material capable of sealing itself with the wall of said pot during hardening.

2. In combination with a pot and a potted plant therein, means for sealing the earth in said pot comprising a layer of porous plastic material capable of sealing itself with the wall of said pot during hardening, said layer being in spaced relation to the top of the pot to form a water receptacle.

3. The combination with a pot and a potted plant therein, said pot having a drainhole in its bottom, of means for sealing the earth in said pot comprising a layer of porous plastic material capable of sealing itself with the wall of said pot during hardening, and a porous plug of the same plastic material similarly sealing said drainhole.

In testimony whereof I affix my signature.

JOHN THOMPSON LOVETT, Jr.